United States Patent
Windhab et al.

(10) Patent No.: US 6,894,178 B1
(45) Date of Patent: May 17, 2005

(54) METHOD OF PRODUCING SEED CRYSTAL SUSPENSIONS BASED ON MELTED FAT

(75) Inventors: Erich Windhab, Hemishofen (CH); Yuantong Zeng, Zurich (CH)

(73) Assignee: Camille Bloch S.A. (CH)

( * ) Notice: Subject to any disclaimer, the term of this patent is extended or adjusted under 35 U.S.C. 154(b) by 0 days.

(21) Appl. No.: 09/959,795

(22) PCT Filed: May 29, 1999

(86) PCT No.: PCT/EP99/03734

§ 371 (c)(1),
(2), (4) Date: Nov. 7, 2001

(87) PCT Pub. No.: WO00/72695

PCT Pub. Date: Dec. 7, 2000

(51) Int. Cl.[7] .................................................. C11B 7/00
(52) U.S. Cl. ........................ 554/211; 426/417; 426/631
(58) Field of Search ........................ 554/211; 426/417, 426/631

(56) References Cited

U.S. PATENT DOCUMENTS 4,594,194 A * 6/1986 Dieffenbacher ............. 554/211

FOREIGN PATENT DOCUMENTS

| EP | 0 496 310 A | 7/1992 |
| EP | 0 521 205 A1 | 7/1993 |
| JP | 02 242639 A | 9/1990 |
| WO | WO 98/30108 | 7/1998 |

* cited by examiner

Primary Examiner—Deborah D. Carr
(74) Attorney, Agent, or Firm—Dorsey & Whitney LLP

(57) ABSTRACT

The invention relates to a process for producing seed crystal suspensions based on melted fat. In particular, the invention describes a process for generating stable microdisperse cocoa butter crystal suspensions which have a high $\beta_{VI}$ modification share and using the seed suspensions in the seed crystallization of fat-based suspensions containing disperse solid particles such as chocolate, chocolate-like masses, or the like. The invention also describes an apparatus for carrying out the process.

14 Claims, 16 Drawing Sheets

METHOD OF PRODUCING SEED CRYSTAL SUSPENSIONS BASED ON MELTED FAT

TECHNICAL FIELD

The invention relates to a process for producing seed crystal suspensions based on melted fat, in particular for generating stable microdisperse cocoa butter crystal suspensions which have a high $\beta_{VI}$ modification share and its use in the seed crystallization of fat-based suspensions containing disperse solid particles such as chocolate, chocolate-like masses, or the like.

Furthermore, the invention relates to an apparatus for carrying out the process.

BACKGROUND

The aim of the so-called precrystallization step in the conventional production of chocolate or chocolate-like masses is the generation of a sufficiently large number of fat crystal germs which, after the forming or molding of the mass, initiate the further solidifying crystallization in the subsequent cooling process. It is of particular importance therein that the germ crystals generated in the precrystallization step are present in a desired stable crystal modification. For the cocoa butter fat system these are the so-called $\beta_V$ and $\beta_{VI}$ crystal modifications in which the principal triglycerides of the cocoa butter (SOS, POP, SOP, S=stearin, O=olein, P=palmitin) are present arranged in a triclinic crystal lattice. So-called unstable modifications are the γ-crystal structures (amorphous), α-crystal structures (hexagonal), and $\beta_{IV}$-crystal structures (orthorhombic). The modification of the crystal germs determinatively affects the formation of additional crystals during the cooling and solidification of the molded, precrystallized masses.

To the extent that the germ crystals consist predominantly of unstable modifications, a predominantly unstable rigid end product results as a consequence after the termination of the cooling process in the production process. During storage unstable crystals are converted into stable modifications even at low storage temperatures since they are thermodynamically more stable and therefore of lower energy. Crystals of unstable modifications have a less dense hardening structure. This, and the diffusion process running during the modification conversion, require that, in particular, fat portions with a low melting point are "transported" to the surface of the chocolate product and there form a crystal film, so-called bloom. This bloom causes the graying of the chocolate surface and thereby a clear affect on the quality of the chocolate. If sufficiently stable crystal germs are generated during the precrystallization, no bloom formation is shown during storage.

Along with the generation of crystal germs which are as stable as possible during the precrystallization, it is in particular also a goal to minimize as much as possible the total amount of the generated crystal germs without endangering the effective precrystallization quality, since this leads to a reduced viscosity during molding or forming of the precrystallized mass and thereby to processing advantages. Low mass viscosities are a prerequisite for the uniform forming, for example, in production of coatings for filled products (production of hollow bodies) in order to insure uniform wall thicknesses.

In traditional precrystallization processes ca. 0.5 to 2% relative to the total fat mass are solidified in the form of germ crystals. Depending on the origin (provenance) of the cocoa butter as well as due to the physical/chemical interaction between the triglycerides (fats) and other components of the formulation (in particular emulsifiers), the crystallization kinetics can run differently. This necessarily leads, with the largely determined dwelltime in the industrial process, to sharp deviations in the precrystallization state, which has an effect on the quality of the product. In the traditional precrystallization technology it is attempted to realize as optimal a precrystallization as possible by variation of a step-wise management of the temperature. This requires on the one hand much empirical experience and on the other hand the adjustability is problematic even for small deviations in temperature in the precrystallization process (for example, +/–1° C.).

The so-called temperature meter process serves to monitor the precrystallization quality in the traditional process monitoring (offline). In this measurement process a small sample volume, which is drawn from the precrystallization apparatus at precrystallization temperature, is introduced into a sample tube, at whose center a temperature sensor in installed. The sample tube is cooled under defined temperature conditions (water bath) and the temperature curve measured in the sample. The temperature curve determined reflects the curve of the solidifying crystallization in the sample. The "inclination toward crystallization" can be identified in this manner with a certain temperature curve (as a function of time) due to the precrystallization release of heat of the sample. Depending on the form of a temperature curve of this type one skilled in the art can make a classification of "over, under, and well temperature-controlled".

Traditional processes or apparatuses for the precrystallization of chocolates work according to the principle of a step-wise temperature control. This means that the chocolate mass arriving at temperatures >45° C. in a temperature controller (precrystallizer) as a rule is easily precooled in three temperature control zones (temperature control zone 1: ca. 30° C.), then supercooled (temperature control zone 2:25 to 27° C.), and finally warmed up to a processing temperature (temperature control zone 3: 28 to 31° C.). The exit temperature from traditional precrystallizers (temperature controllers) is between 28 and 31° C., in rare cases slightly over 31° C. If a mass is pretemperature-controlled as described, then the direct analysis of the germ crystals arising, said analysis being performed by means of a so-called direct DSC (Differential Scanning Calorimetry) measurement on the mass drawn after the crystallizer, shows a typical crystal modification spectrum. In the case of cocoa butter as a continuous fatty phase, the predominant share of the crystal germs consists of $\beta_V$-crystals (50–70%), followed by $\beta_{IV}$-crystals (20–40%), as well as in part of remnants of α-crystals (ca. 10%). As a rule a predominant share of $\beta_V$-crystals guarantees that the solidifying crystallization will achieve a sufficient quality of structure to insure bloom stability and other marks of quality (for example, crisp breaking behavior, soft melt). Nonetheless, in the case of traditional crystallized chocolate masses, in particular when fatty shares with a low melting point (for example, milk fat or nut oil) are also contained, quality deficiencies frequently occur due to the formation of bloom. Partially the bloom first shows itself after 2–3 months storage (possibly even longer). Chocolates with bloom cannot be sold or lead to customer returns.

From WO 98/30108 a process for the precrystallization of chocolates is known in which the melted product is seeded directly with a crystal powder. As will be described further below, the seeding by means of crystal powders is associated with numerous disadvantages in practice.

SUMMARY

The objective of the invention is to produce concentrated (crystal share of 5–35% by volume) seed crystal suspensions which contain microdisperse (particle diameter <10 micrometers (μm)) nearly exclusively (≧95%) thermally highly stable (polymorphous crystal modification with the highest melting point, for example, $\beta_{VI}$-modification in the case of cocoa butter) fat crystals and to dose and homogeneously mix them continuously and uniformly in low concentration (crystal share ca. 0.01–0.2%) into the product flow previously brought to seed temperature and thereby to improve traditional processes of precrystallization in such a way that even with a clear increase (ca. 2–3° C.) the mass temperature over the prior-art precrystallization temperatures (for chocolates previously at most ca. 31° C.) in contradiction to traditionally precrystallized masses the crystal germs do not melt in such a way that the desired crystallization initiation capacity is lost on cooling of the mass but is instead preserved to the extent required and that thereby even at increased molding temperatures of ca. 34° C. in the case of chocolates, or greater deviations of molding temperatures, faultlessly crystallized products with very good quality characteristics can be produced and moreover the reduction in viscosity setting in at the high processing temperatures according to the invention can be utilized advantageously in the production process.

Furthermore, the objective of the invention is to provide an apparatus for carrying out the process according to the invention.

In the process according to the invention the production of concentrated (crystal share 5–35% by volume) seed crystal suspensions, which contain microdisperse (particle diameter <10 micrometers (μm)) exclusively thermally highly stable (polymorphous crystal modification with the highest melting point 50–95% $\beta_{VI}$-modification in the case of cocoa butter, rest $\beta_V$-modification) fat crystals, is done in a process according to the invention comprising up to three treatment steps. These three treatment steps are:

1. A cold spray step in which a melted fat (for example, cocoa butter) is sprayed into a supercooled space and is solidified to form a powder capable of flowing with powder particle sizes of ca. 100–200 micrometers (μm) consisting of initially unstable crystal modifications (for example, γ-modifications, α-modifications, and $\beta_{IV}$ modifications in the case of cocoa butter).
2. A multi-step thermal conditioning step is performed in which a modification conversion of the fat crystals is done until reaching a ca. 50% share of the most stable crystal modifications ($\beta_{VI}$ modifications in the case of cocoa butter).
3. A shearing/extending treatment step in which with the input of mechanical energy the crystal powder from step 2 suspended in a melted fat is sheared/extended where under suitable coordination of the input of mechanical energy, temperature, and dwelltime a reduction of the suspended crystal particle size through partial melting and mechanical decomposition processes and a nearly complete (>/+95%) modification conversion into the crystal modification with the highest melting point as well as a setting of the crystal share to 5–35% by weight takes place. The shearing/extending treatment step is preferably done in a cylindrical column through which flow occurs axially with a rotating inner cylinder with adjustable speed of rotation which can also have a scraping element installed. With respect to the speed of rotation the degree of shearing and extension can be set substantially independently of mass flow.

The addition of cold-sprayed (process step I) and conditioned (process step II) powder containing ca. 50% $\beta_{VI}$-cocoa butter powder is in principle absolutely necessary only in the first application of the seed crystal suspension. If liquid cocoa butter is added to a remnant of this suspension, new seed suspension can be generated within a time period of ca 30–60 minutes (depending of the input of mechanical energy) with temperature and stirring conditions held constant.

In a particular form of embodiment of the process according to the invention the generation of a seed crystal suspension can also be done without the process steps I and II, that is, by direct production of the supercooled melted fat in a shear treatment step. Therein however, for crystal germ formation initiation, there is the necessity of setting clearly lowered wall temperatures of the shearing geometry through which flow is to occur (of ca. 10 to 28° C. for cocoa butter) and extending the dwelltimes in the shear flow field sufficiently, that is to 20 to 500 s, in order to be able to be able to set a desired germ crystal content of 5 to 35% by weight. In this special case of the restriction on process step III, however, no $\beta_{VI}$-crystal germ content (in the case of cocoa butter) >50% can be achieved with a one-time passage through the shearing treatment step with reduced wall temperature. Instead of this the lowered wall temperatures necessary for the acceleration of crystal germ formation and crystal growth kinetics cause additional $\beta_V$-germ crystals to arise (for cocoa butter) to the extent of >50%. In so far as a multiple passage through the shearing step is realized, the $\beta_{VI}$ share can be increased if as of the 2nd passage there is also an increase of the wall temperature to 25–32° C. A multiple passage through the shearing step can also be done in principle by performing such shearing steps one after the other.

In the case of chocolate or chocolate-like masses with cocoa butter shares in total fat of ≧5% a crystal germ suspension produced as described initially is continuously dosed in shares with 0.01 to 0.2% by weight crystal share (relative to the total mass) into the mass precooled to temperatures between 32 and 34.5° C. in the case of pure cocoa butter fat or between 27 and 34.5° C. in the case of masses with shares of fat with a low melting point. The microhomogeneous mixing is done in a temperature-controlled, static mixer integrated into the product tube line.

The seeding by means of a germ crystal suspension permits clear advantages to be realized vis-à-vis direct seeding with crystal powders. These are essentially:

1. Improved dosability since fluid dosing is possible. The exact dosing of fat crystal powders is comparatively extremely difficult and, with restrictions in the dosing quality, only possible in open containers. Open containers are not desirable in continuous industrial processes (hygiene, operational reliability).
2. Better microhomogeneous mixing in the chocolate matrix results due to the presence of individual seed crystals in the suspension. In the case of dosing of seed crystals in powdered form a partial conglomeration of the powder particles results as a rule as soon as, or even before, contact with the fluid phase is produced.
3. Clearly smaller germ crystals (ca. 1 to 10 micrometers) can be generated in the suspension by stressing it mechanically and thermally, in part via so-called secondary nucleation. By comparison, minimal fat particle sizes of only ca. 20–200 micrometers can be achieved with cold-sprayed or cold-milled fat powders. Thus a higher numerical density of crystal germs in the product volume (chocolate) than with powders can be achieved with shearing-treated seed crystal suspensions with clearly lower seed crystal mass dosing.

This leads to a faster and more homogeneous solidification of the product on subsequent cooling in a cooling tunnel.

4. A higher seeding efficiency vis-à-vis crystal powders can be achieved, despite the reduced total amount of added crystals, with the use of seed crystal suspensions for setting a comparable precrystallization quality (on the basis of Points 1–3). This has as a consequence the fact that the processing viscosity of the mass does not increase after seed crystal dosing in the case of seed crystal suspensions, as in the case of the addition of seed powders, but rather can be lowered still further. This offers advantages for the further processing steps (for example, the molding process).

In the solidifying crystallization in the case of chocolate or chocolate-like masses which are seeded with $\beta_{VI}$-crystals, surprisingly predominantly $\beta_V$-crystals as well as, in given cases, a very small percentage (<5%) of $\beta_{IV}$-crystals are generated. Thus chocolate masses precrystallized with $\beta_{VI}$-crystals as a rule do not have a melting spectrum shifted significantly toward higher melting temperatures in comparison to traditionally well precrystallized chocolate masses. α-shares are not observed. Since the $\beta_V$-modification has precisely the same crystal lattice structure (triclinic crystal lattice) as the $\beta_{VI}$-modification (seed germs), the described effect of the $\beta_{VI}$-seeding, that is, the generation of nearly exclusively $\beta_V$-crystals, appears physically completely logical, if surprising.

There is a significant difference between traditional precrystallization and seed precrystallization with $\beta_{VI}$-germs with regard to the possible exit temperature from the precrystallization process. In traditional precrystallized masses, which typically are processed further at temperatures of 28–31° C. (molding, forming processes), sufficiently effective amounts of germ crystals are no longer present at temperatures ca. 31.5 to 32° C. The mass then crystallizes without control. In the case of seed crystallization with $\beta_{VI}$-crystal germ suspensions still sufficient germ crystals are obtained even at mass exit temperatures (or seed temperatures) of 34° to 34.5° C.

In contradistinction to $\beta_V$-crystal germs generated in the conventional precrystallization process, the cocoa butter $\beta_{VI}$-crystal germs dosed in the case of seed precrystallization have a melting temperature range (ca. 34° to 39° C.) shifted to clearly higher temperatures but the same crystal lattice structure (triclinic lattice structure). The beginning of melting of $\beta_{VI}$-seed crystals is ca. 34° C. Traditionally generated germ crystals in the precrystallization are already nearly completely melted at 32.5° C. Thus for traditional precystallization a strong dependence of the precrystallization quality on the exit temperature at the precrystallizer (usually ca. 29°–31° C.) results as a rule. Deviations customary in production of +/−0.5°–1° C. can already cause sharp differences in precrystallization. Comparable variations in temperature in the seed precrystallization in the temperature range up to ca. 34° C. (average temperature) show no influence on the precrystallization quality.

Additional advantageous characteristics and effects follow from the following description of the drawing in which the invention is illustrated, in part schematically, by way of example.

DETAILED DESCRIPTION OF THE DRAWINGS

Figure 1:
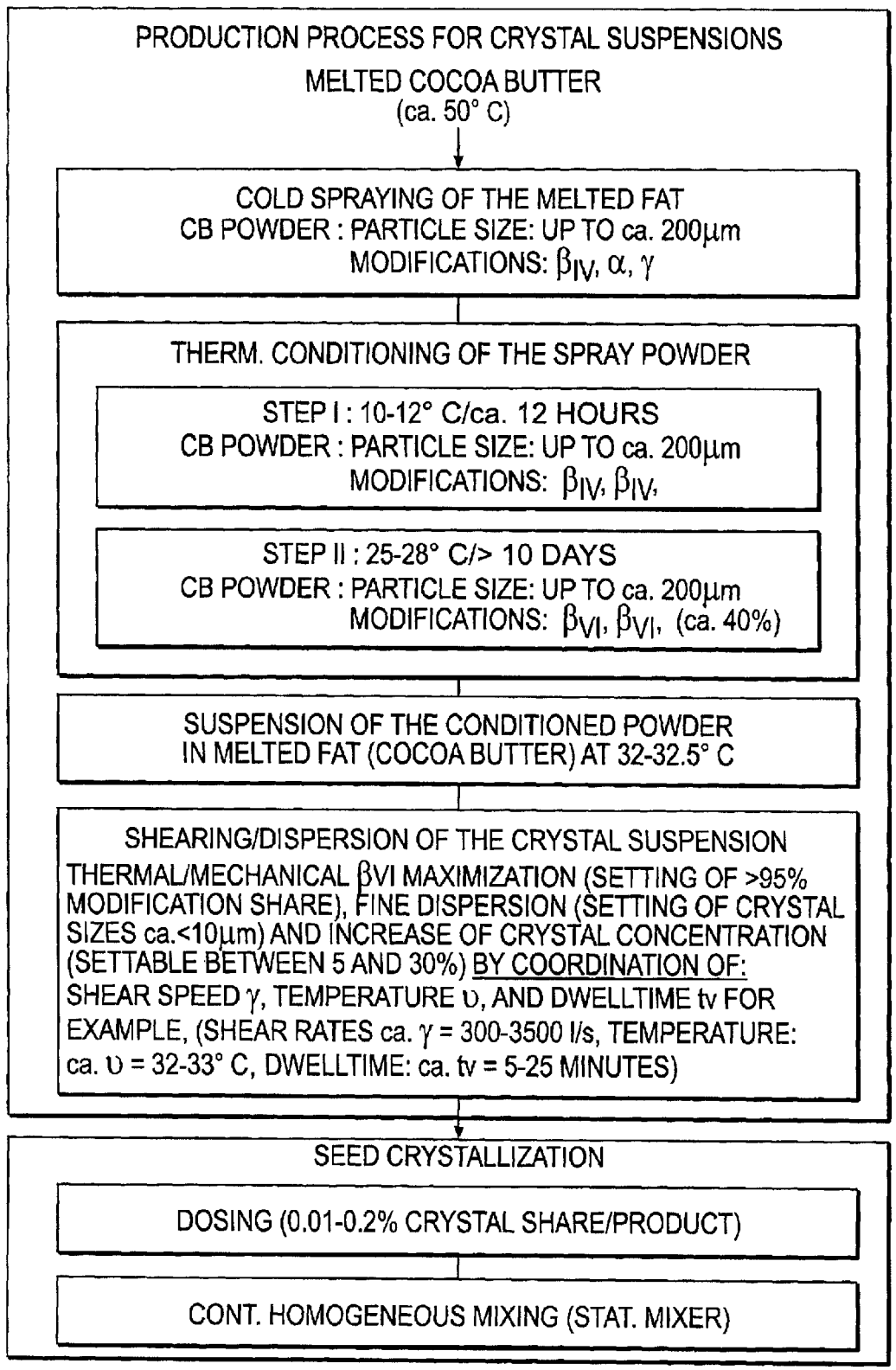
FIG. 1 a schematic representation of the process for the production of fat-based seed crystal suspensions with highly stable fat germ crystals and their use in seed crystallization with the use of cold-sprayed fat powder, FIG. 2 a schematic representation of the process for the production of fat-based seed crystal suspensions with highly stable fat germ crystals and their use in the seed crystallization without the use of cold-sprayed fat powder, FIG. 3 a representation of the apparatus for the production of the seed crystal suspension as well as its dosing and mixing in seed crystallization, FIG. 4 installed elements in the shearing/extending module for improved crystal dispersion, FIG. 5 a detail from FIG. 4 on an enlarged scale, in part in section, FIG. 6 a detail from FIG. 4 represented broken and on an enlarged scale, also in section, FIG. 7 geometry of rotating shaft and wall-scraping measurement installed elements for achieving alternating spreading/extending and wall-scraping processes, FIG. 8 a comparative investigation of seed-precrystallized and conventionally precrystallized chocolate by means of differential thermoanalysis, FIG. 9 the melting temperature spectrum of the pure seed crystal suspensions, FIG. 10 temperature curves for chocolate masses seed-precrystallized at different temperatures, FIG. 11 temperature curves for a chocolate precrystallized conventionally at different temperatures, FIG. 12 viscosity of seed-crystallized masses as a function of time, FIG. 13 melting temperature spectra of seed crystal suspensions generated only in a shearing/extending module without the use of a cold-sprayed cocoa butter powder, FIG. 14 melting temperature spectra of seed crystal suspensions generated in a 2-step shearing/extending module without the use of a cold-sprayed cocoa butter powder, FIG. 15 two-step shearing/extending module (schematic sketch), FIG. 16 layout of the control/regulation for the setting of exit temperature and seed crystal content, and FIG. 17 showing the generated crystal content of a seed crystal suspension between 5 and 22% as a function of the speed of rotation.
Figure 2:
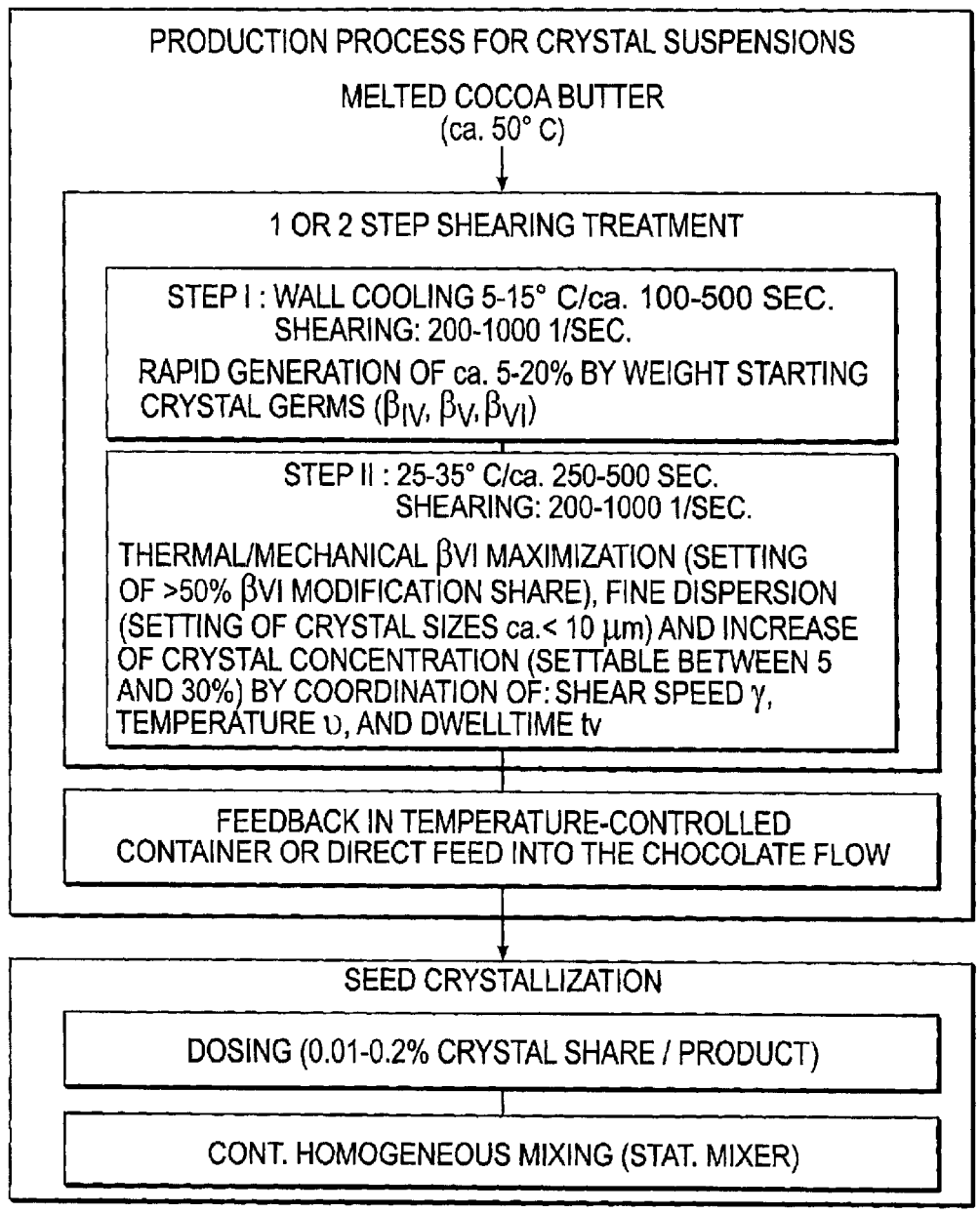

FIGS. 1 and 2 describe schematically the process for the production of fat-based seed crystal suspensions with highly stable fat germ crystals and its use in seed crystallization.

FIG. 1 takes into account the use of cold-sprayed fat powders as starting germ crystals while FIG. 2 describes the particular inventive form of embodiment of the process without the use of fat powders. Here the starting germ crystals are generated directly in the melted fat in a shearing treatment step.

Figure 3:
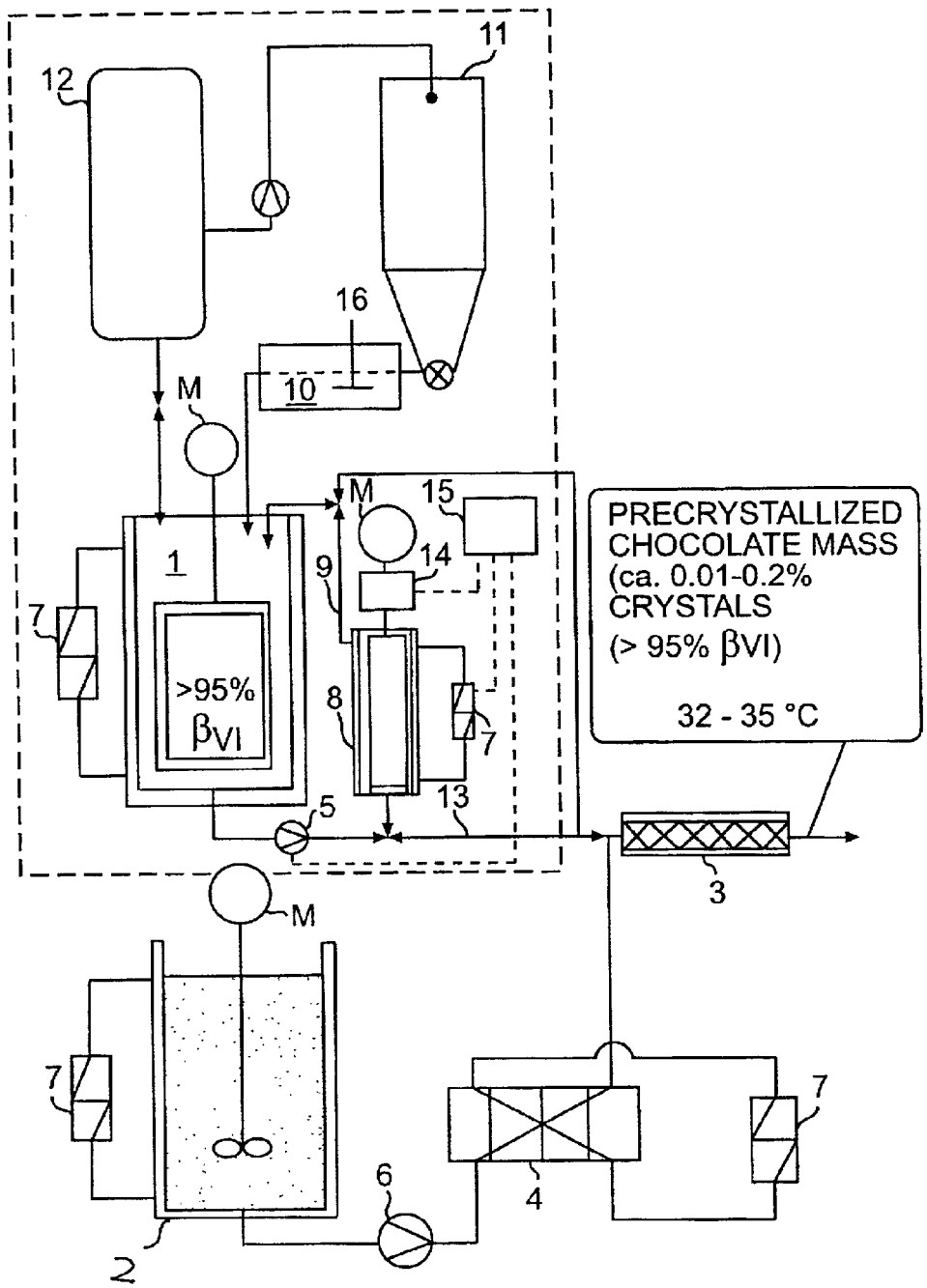

In FIG. 3 the apparatus for generating concentrated seed crystal suspensions according to the invention with highly stable, finely dispersed fat crystals is represented.

The reference number 1 denotes a storage container for cocoa butter in which the crystal suspension is kept at about 32° to 33° C. The reference number 2 denotes in FIG. 3 a storage container with chocolate mass which is kept at a temperature of 50° C.

A static mixer is denoted by 3, while 4 denotes a heat exchanger.

A dosing pump is denoted by the reference number 5 while 6 denotes a process pump with which the chocolate mass can be conveyed. 7 denotes recirculation thermostats while 8 denotes a so-called shearing/extending module. 9 denotes a suspension feedback formed as a line and 10 denotes a multi-step thermal conditioning.

The reference number 11 denotes a cold-spray tower in which the fat mass in question is cold-sprayed at about −40° to 0° C.

The reference number 12 denotes a cocoa butter tank in which the cocoa butter is kept at 50° to 60° C.

A 3-way cock is denoted by 13, while 14 denotes a torque-measuring apparatus. The reference number 15 denotes a regulation unit for the shearing/extending module 8.

Figure 4:
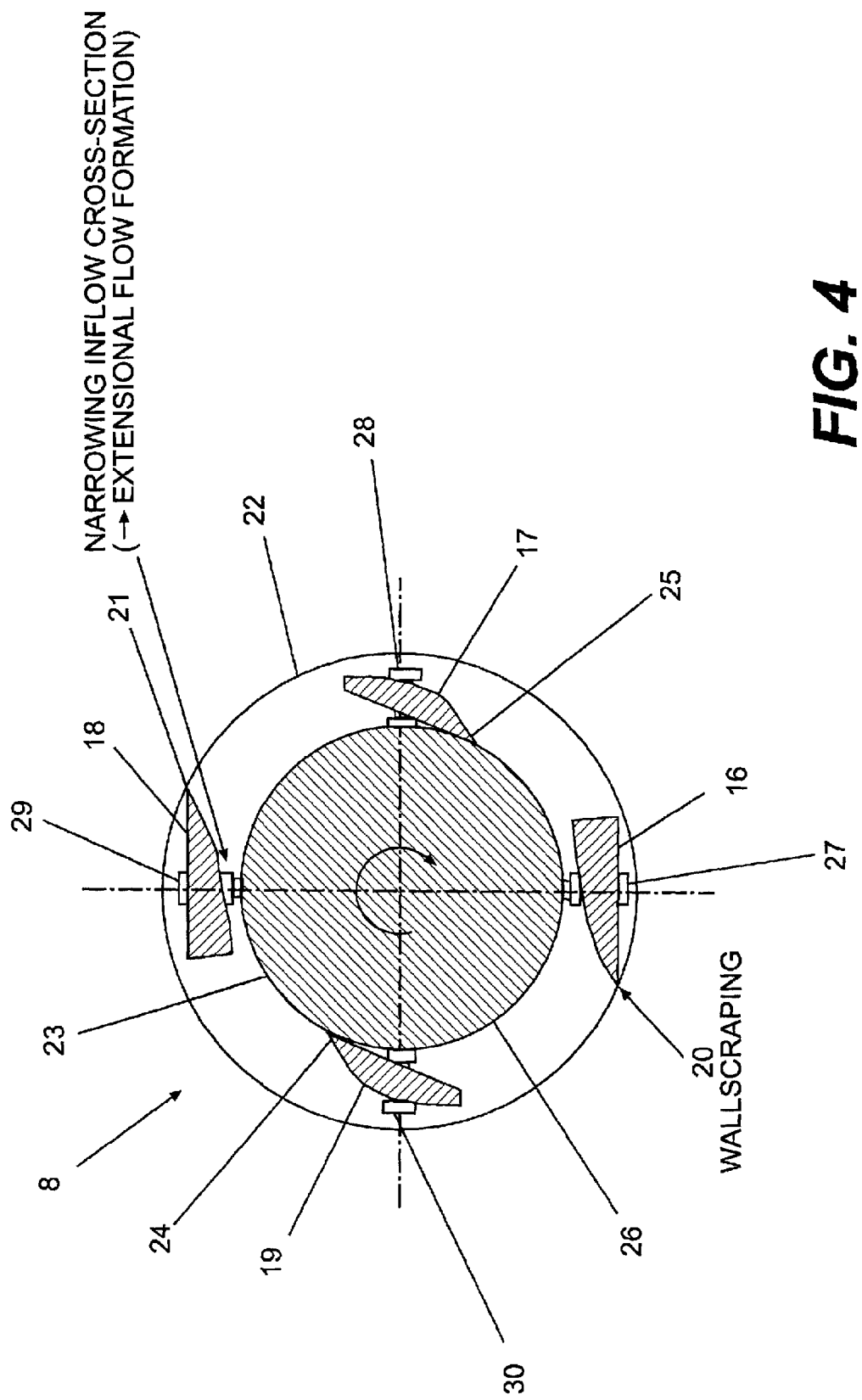

FIG. 4 describes entrained installed elements integrated into the shearing module 8, said installed elements on the one hand making possible the scraping of newly formed crystal from the temperature-controlled (cooled) wall and on the other hand with corresponding inventive forming of the installed elements (FIG. 4, Pos. 3), as represented in FIG. 4, permitting the realization of the generation of extensional flows (laminar flows accelerated in the direction of flow). Extensional flows are in particular efficient in the fine dispersion of the crystals or crystal conglomerates.

Figure 5:
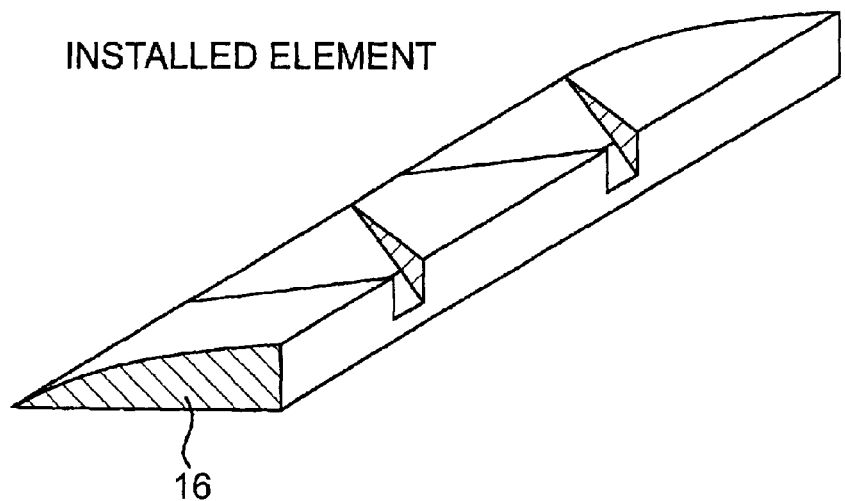
Figure 6:
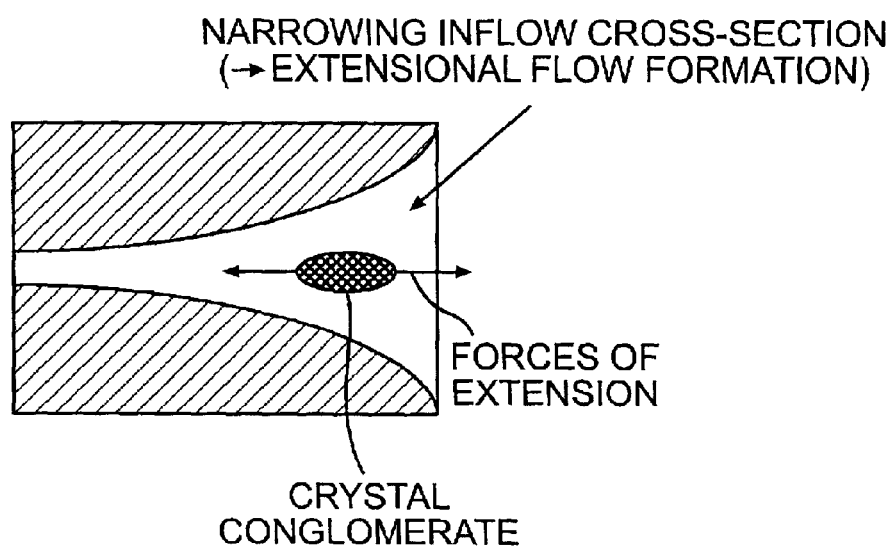

In FIGS. 4 to 6 entrained installed elements 16, 17, 18, and 19 integrated in the shearing module 8 and formed as shearing/extending elements are represented, said installed elements being essentially formed as supporting blades and structured running tapered or conically to a point on one side, which is the same side. As can be seen in particular from FIG. 4, the installed elements 16 and 18 lie with their pointed or tapered edge areas 20, 21 on the inner face 22 of the drum in which a shaft body 23 driven by a motor is coaxially disposed. The two installed elements 17 and 19 lying diametrically opposite one another are associated with this shaft body 23, said installed elements being structured in principle like the installed elements 16 and 18, therefore also having a blade-like extension (FIG. 6) and with their pointed or tapered edge areas 24, 25 lying on the outer periphery 26 of the container 23. In this manner the installed elements 16 and 18 are in the position of lying on the inner cylindrical face 22 and thus to accelerate the flow in the column between the inner cylinder face 22 and the outer edges of the installed elements 16 and 18, while the installed elements 17 and 19 lie scrapingly on the periphery 26.

From FIG. 4 it can furthermore be seen that the installed elements 16 to 19 are each connected to the container 23 via support elements 27 to 30. The support elements 27 to 30 can be adjusted synchronously or individually and can also be arrested in their respective positions. Furthermore, it is possible to structure the support elements 27 to 30 so that they are in the position to adjust or readjust the blade-like installed elements 16 to 19 with regard to their setting angle in order to position or to arrest the edge areas 20, 21 or 24, 25 in relation to the respective cylinder face spatially and/or with the required force of compression. For this purpose a spring element also not represented can be assigned to the support elements 27 to 30 so that the blade-like installed elements, in given cases, lie on their associated cylinder faces as elastic springs. This lying as elastic springs can also be accomplished by a hydraulic cylinder (not represented).

The rotating installed elements 16 to 19 are formed as shearing elements and rotate with the shaft body 23. The elements 17 and 19 make possible the scraping of newly formed crystals from the temperature-controlled (cooled) wall. The elements 16 to 18 spread the fluid mass on the inner cylinder face 22. Furthermore, it follows from FIG. 5 that in the case of the corresponding inventive forming of the installed elements 16 to 19 extensional flows into the tapering influx cross-sections between the blade-like installed elements 16 to 19 on the one hand and on the other hand the associated cylinder face 26 and laminar flows accelerated thereby can be realized. Extensional flows of this type are in particular efficient in the fine dispersion of the crystals or crystal conglomerates as is indicated schematically and in extract in FIG. 5.

For the cold-spraying of the melted fat in the cold-spray tower 11 a cold gas flow is generated which has a temperature of 10° to 50° C. below the crystallization temperature of the sprayed fat system and has fat spray particles with a diameter of 100 to 200 micrometers ($\mu$m) which are subsequently conveyed into the thermal multi-step conditioning 10 formed as a temperature control chamber, where in one thermal conditioning of two or more steps the controlled modification conversion (formation of 10 to 50% $\beta_{VI}$ share) takes place without clumping of the spray powder particles. Subsequently the conditioned powders are suspended in a melted fat (cocoa butter) supercooled to 32° to 32.5° C. in a temperature-controlled stirring/mixing container and subsequently thereto these spray suspensions are sheared in the shearing module 8, through which there is continuous axial flow and which preferably consists of a concentric cylindrical shearing column which has a column width $\leq$5 mm, with simultaneous cooling of the outer wall of the shearing column and therefore of the inner cylinder face 22, with setting of the axial rate of flow through the shearing column by rotation of the container 23 formed as an inner cylinder in such a manner that the exit temperature of the crystal suspension from the shearing column due to the superimposed viscous energy dissipation through shearing and heat discharge can be set between 32° and 34° C., precise to 0.5° C., and simultaneously a fine dispersion of the crystals to diameters of <10 micrometers ($\mu$m) from a starting size of 100 to 200 $\mu$m is done and furthermore, as a function of wall temperature and dwelltime in the shearing column, the exiting crystal suspension is controllably and regulably set to a crystal content of 5 to 35% via the torque transferred to the rotating inner cylinder 23. Thereafter the seed crystal suspension is dosed continuously into the product flow with temperature controlled to 32° to 34° C. with a dosing pump 5 working mechanically protectively and mixed homogeneously and protectively into the product flow by means of a static mixer 3.

The dosing pump 5 insures that the axial rate of flow through the shearing module 8 corresponding to the width of the shearing column and the dosing mass flow for the dosing of a 0.01% to 0.2% crystal share into the product flow is maintained and either, after a one-time direct passage of the crystal suspension through the shearing module 8, it is dosed into the product flow or, from the stirring container in which crystal suspension multiply treated in the shearing module 8 is remixed, this suspension is dosed into the feedback product flow.

Via the control/regulation unit for the shearing module 8 a coordination of the speed of rotation of the shaft body 23 formed as the inner cylinder, the wall cooling temperature of the outer cylinder with its cylinder face 22, and the mass throughput or the dwelltime in the reaction space of the shearing module 8, is set via the speed of rotation of the dosing pump 5, and in fact in such a manner that the seed crystal sizes of 10 to 20 micrometers ($\mu$m) can be set and the exit temperature of the suspension in the case of cocoa butter can be set between 32° to 34.5° C. with a precision of +/−0.25° C.

The static mixer 3 to be integrated into the product flow of the product to be seeded (chocolate masses or the like) has sufficiently large through-flow columns in which, in the case of viscosities relevant for chocolate products of ca. 0.1 to 5

Pas and predetermined mass flows, the local viscous energy dissipation remains sufficiently small to avoid heating the product to temperatures greater than 34.5° C. in the case of pure $\beta_{VI}$ cocoa butter crystal germs. In so doing it is possible to connect an increased number of 10 to 12 static mixing elements in tandem in order to insure a minimal mixing quality of 95%.

Figure 7:
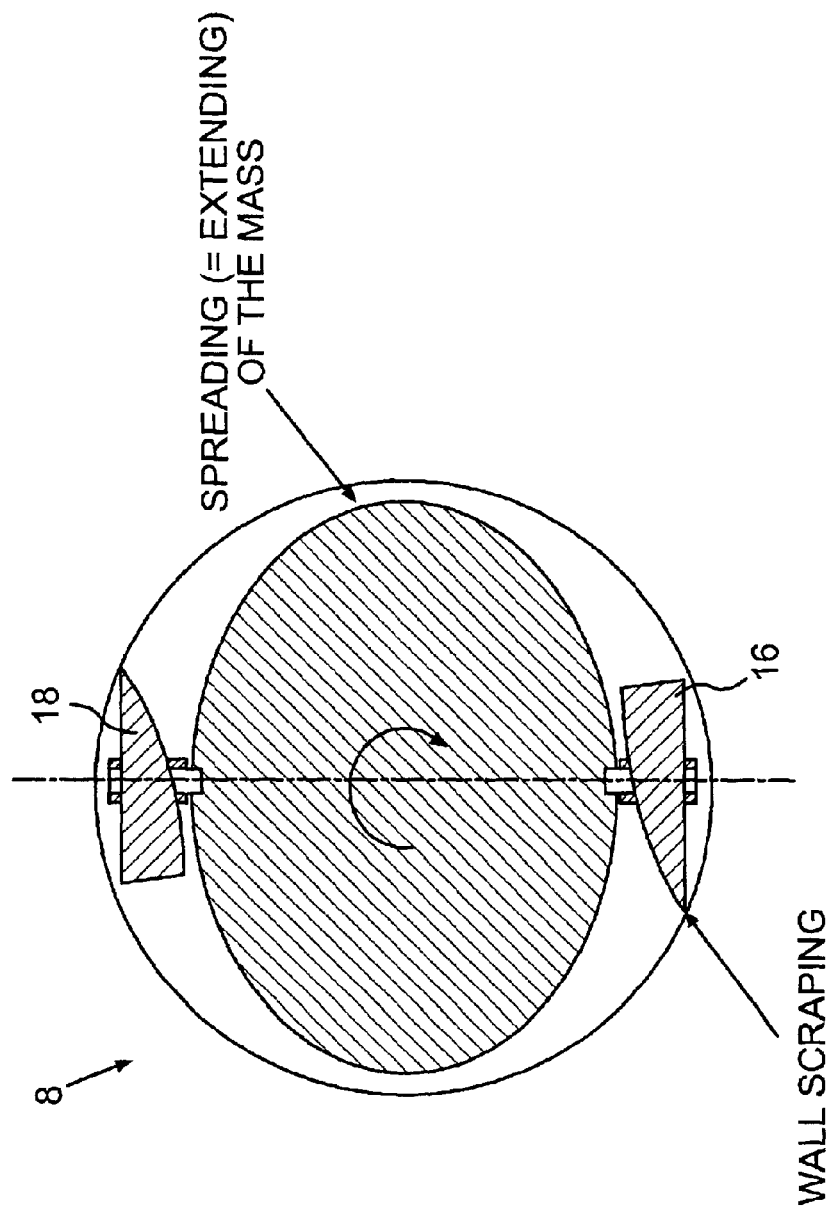

In FIG. 7 an alternative geometry of the rotating inner cylinder is represented which combines wall-scraping elements according to the invention with "spreading-extending zones" generated by the oval geometry of the inner cylinder.

Figure 8:
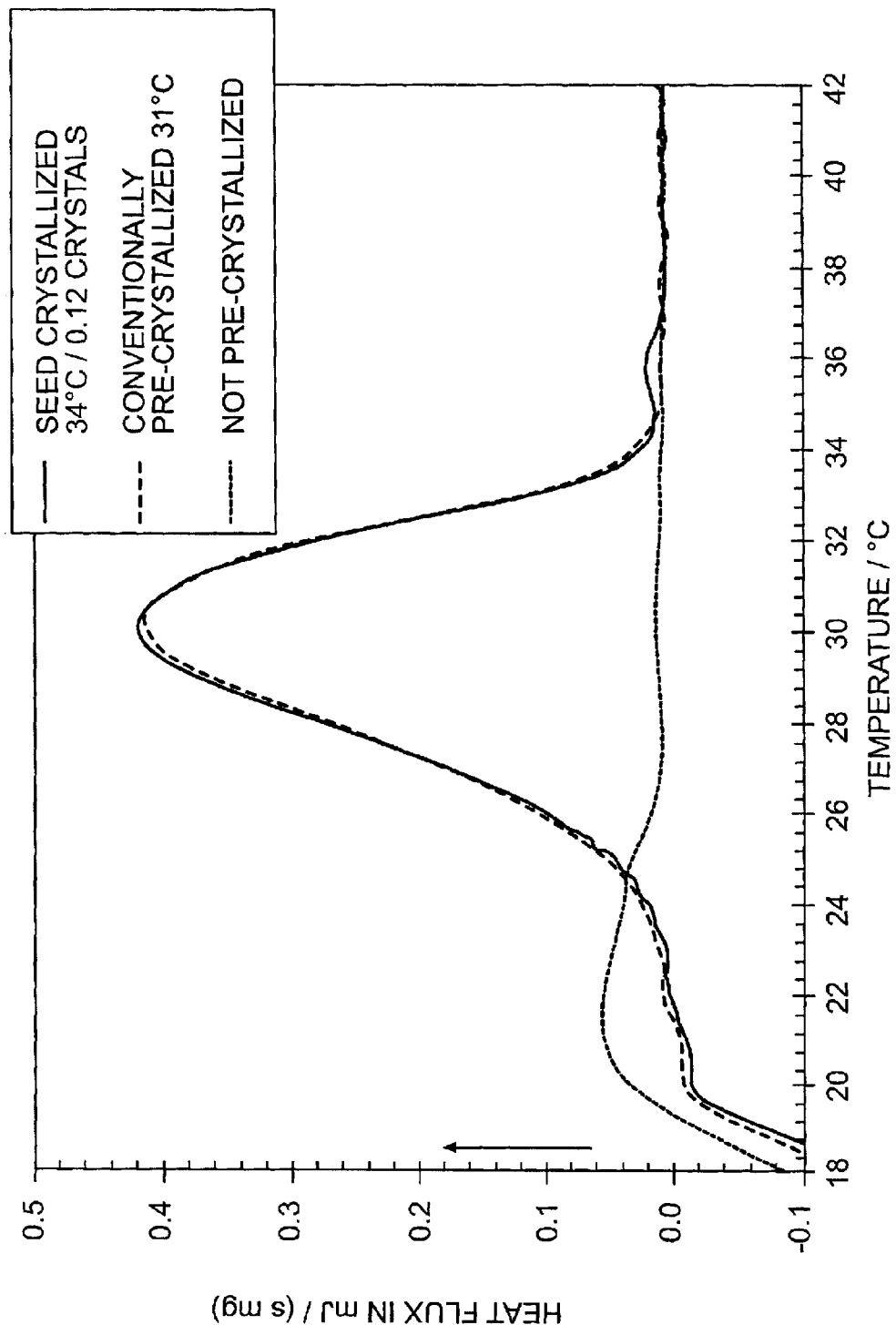

In FIG. 8 the melting temperature or melting enthalpy spectra plotted by means of differential thermal analysis DSC are represented by way of comparison for two pre-crystallized chocolate masses after completion of precrystallization by means of conventional and seed crystallization methods. The melting enthalpy spectra shown in FIG. 8 are plotted after the solidification process. For the conventional and the seed-crystallized mass a fat crystal composite consisting predominantly of $\beta_{VI}$ crystal shares (ca. 65–75%) was shown. A small peak in the range of 34.5–37° C. shows the presence of the 34.5° C. $\beta_{VI}$ seed crystals.

Figure 9:
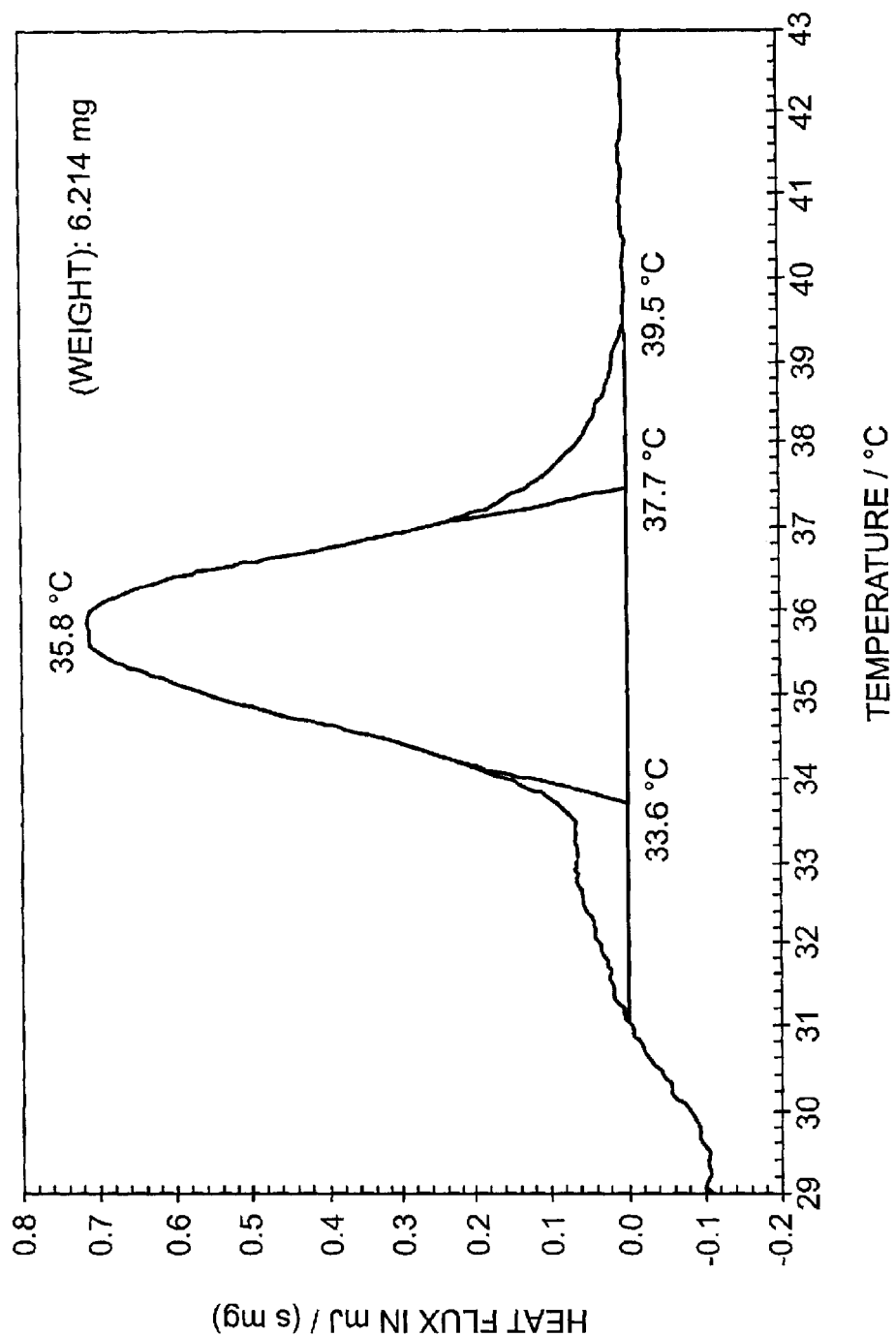

Furthermore, the melting temperature spectrum of the pure seed crystal suspension is plotted in FIG. 9.

Figure 10:
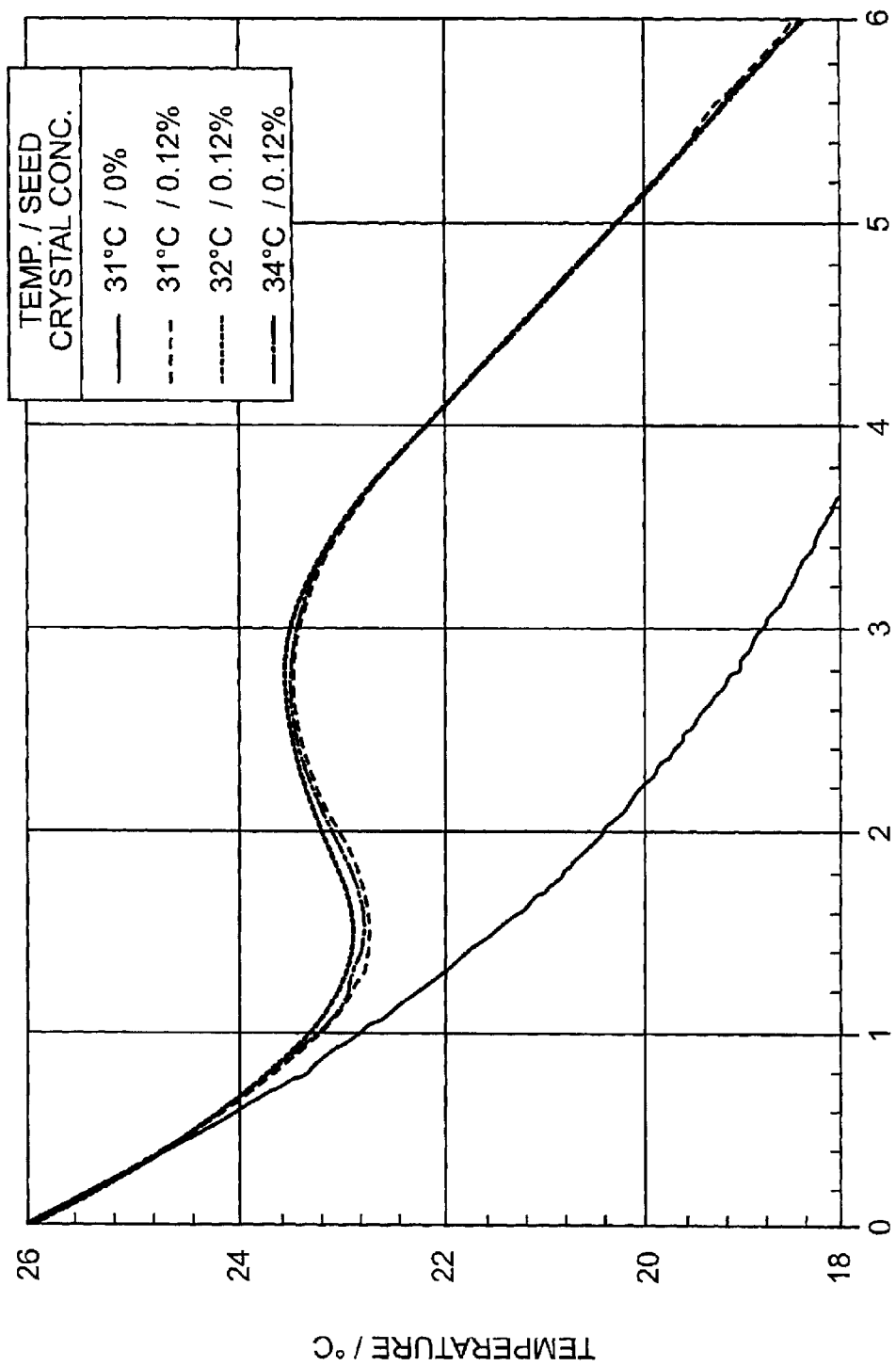

In FIG. 10 so-called temperature curves for chocolate masses seed-precrystallized at different temperatures is represented. These temperature curves describe the curve for the development of the heat of crystallization in a chocolate mass sample which has been taken after the precrystallization process and cooled in the water bath at 8° C. in a sample tube. To the extent that sufficient germ crystals are present in the precrystallized mass, the temperature curve is formed in the form of an S. The temperature curve, plotted for an exit temperature of 34° C., for seed-precrystallized chocolate masses always shows the corresponding temperature curve in the form of an S.

Figure 11:
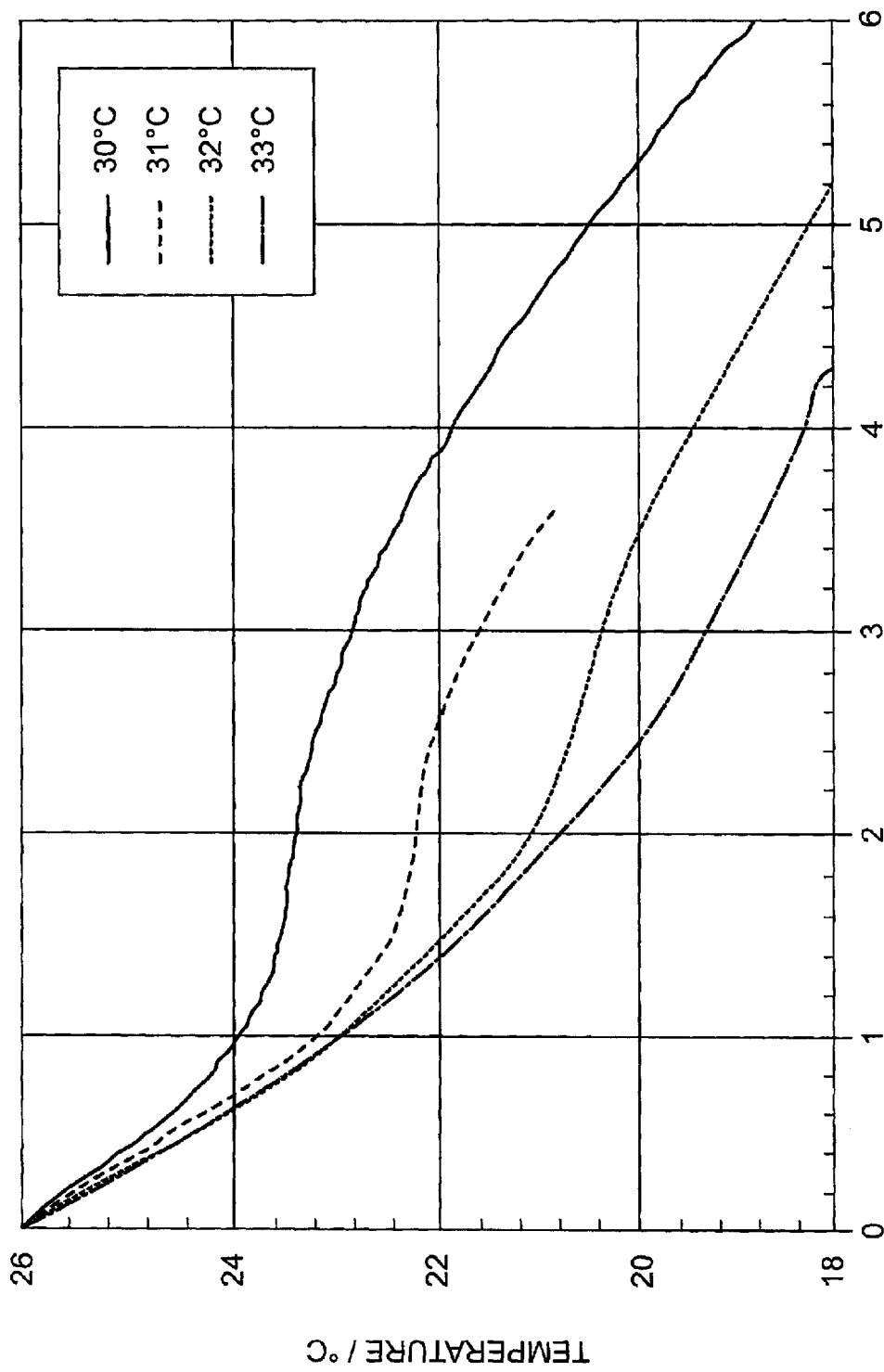

By way of comparison FIG. 11 shows for a conventionally crystallized chocolate a temperature curve plotted for an exit temperature of 32° C. with curve form already clearly without temperature control (deficiency of crystal!). This means the no longer sufficient presence of germ crystals.

Comparative investigations of the quality characteristics of conventionally and seed-precrystallized chocolate masses showed in a plurality of different formulations at least similar quality of the seed-crystallized mass, but many times improved bloom stability of the seed-crystallized samples. In texture (breaking, firmness of bite) seed-crystallized masses frequently have a slightly increased strength with respect to conventionally produced masses. This increase in strength is also evaluated as desirable in most cases.

In particular, masses with shares of foreign fat, which only crystallize late, cannot be precrystallized, or can only be precrystallized incompletely, in traditional temperature systems. This has as a consequence that a long cooling tunnel or low cooling temperatures (with disadvantageous negative consequences for the surface gloss) or long dwell-times in the cooling tunnel are necessary. These disadvantages can be clearly reduced by means of seed precrystallization.

Figure 12:
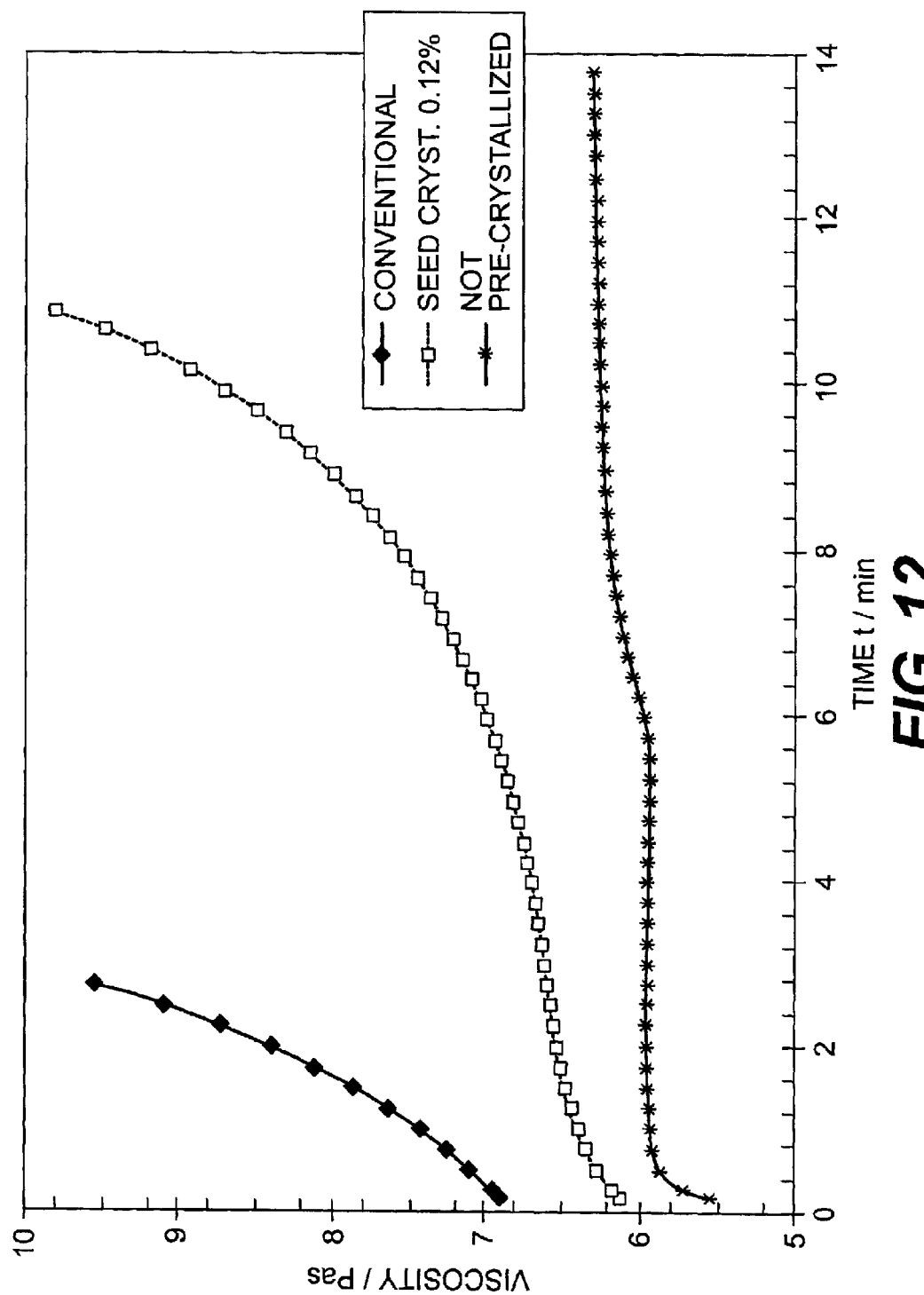

In the case of seed precrystallized masses their sharply reduced viscosity with respect to those crystallized traditionally is particularly clear, and also accompanying their thereby improved and longer processibility at process exit temperature (cf. FIG. 12). A reduced viscosity is of particular advantage in the case of further processing. Accordingly formulations with reduced fat share and nonetheless sufficient flowability for the further production process can be generated by means of seed precrystallization processes.

Figure 13:
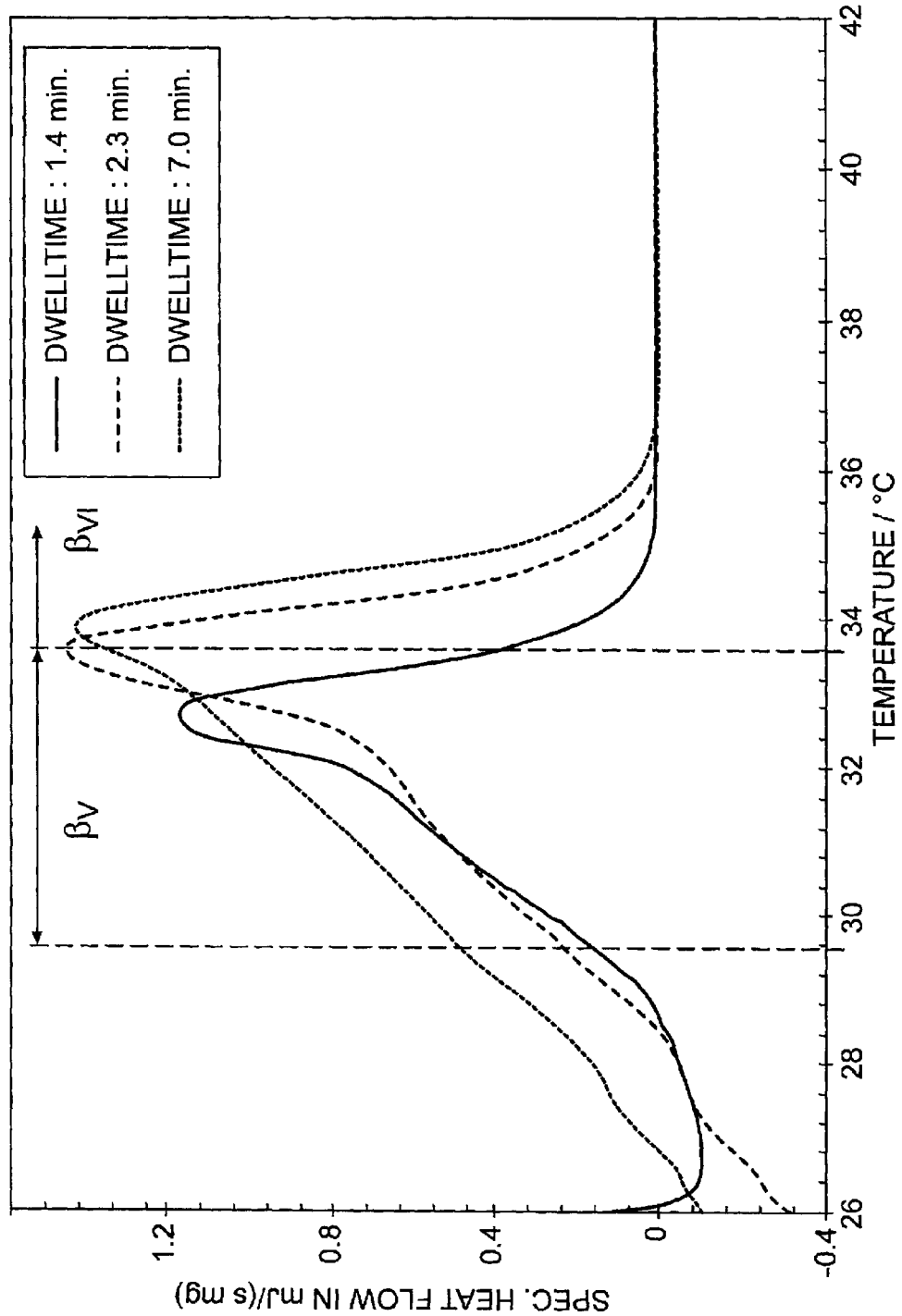

FIG. 13 shows with the aid of calorimetric measurement curves (melt enthalpy spectra) that even in the case of general use of a one-step shearing module high shares of $\beta_{VI}$ crystal shares (ca. 50%, rest $\beta_V$) can be achieved (crystal share corresponds to the surface under the curve shown).

Figure 14:
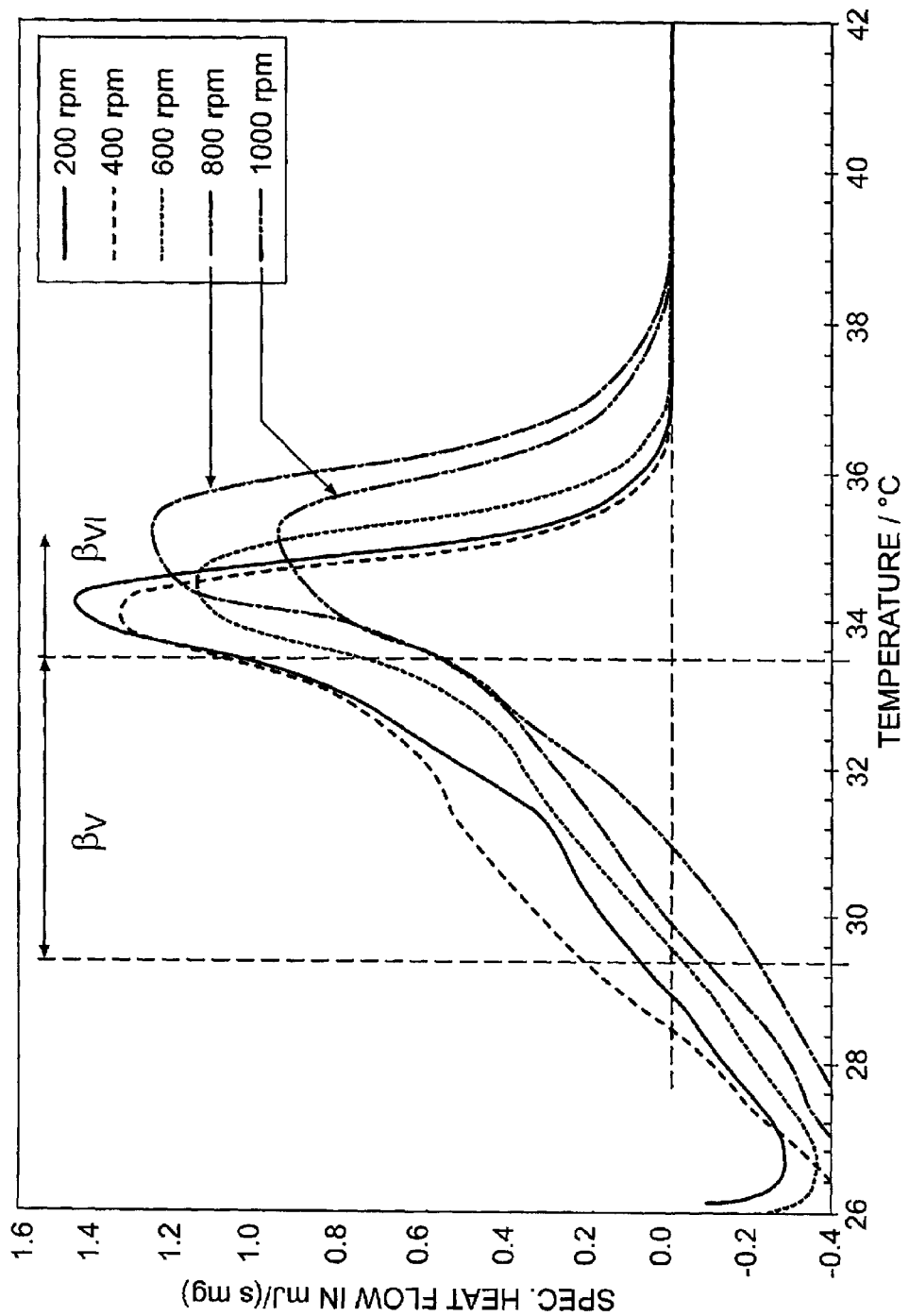

In FIG. 14 it is shown, also with the aid of the melt enthalpy spectra, for a two-step shearing module with two temperature-controlling zones that the $\beta_{VI}$ crystal share with this embodiment of the shearing module can be increased up to ca. 90% with optimized coordination of the speed of rotation (Step I: 900 1/min, Step II: Optimum at 800 1/min), wall temperatures (Step I: 10° C., Step II: 30° C.), and dwelltime (Step I: 420 sec, Step II: 420 sec).

Figure 15:
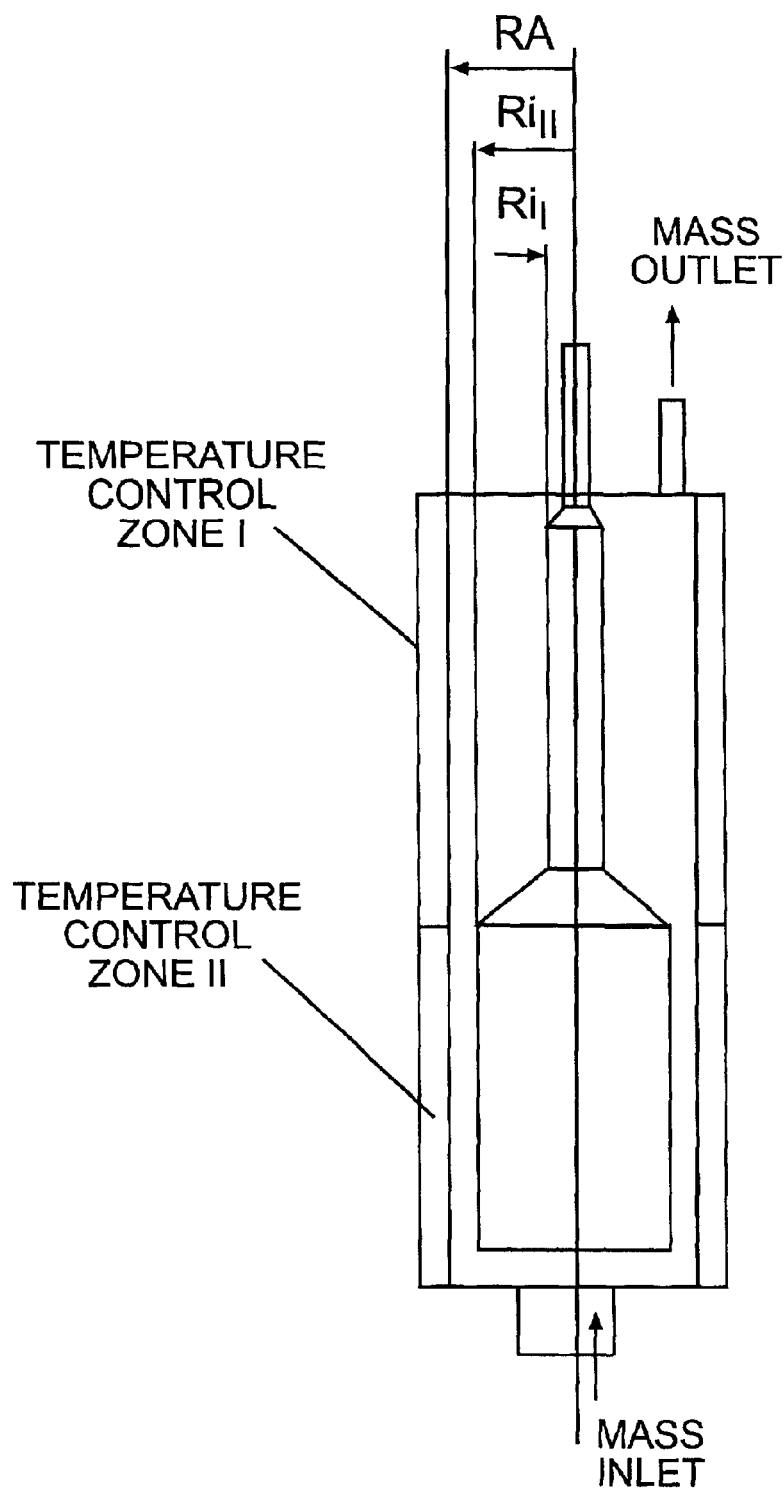

FIG. 15 shows the schematic layout of a two-step shearing module with two temperature control and shearing zones. The inner cylinder areas can in addition be embodied with the installed elements or geometries described in FIGS. 4 and 7.

Figure 16:
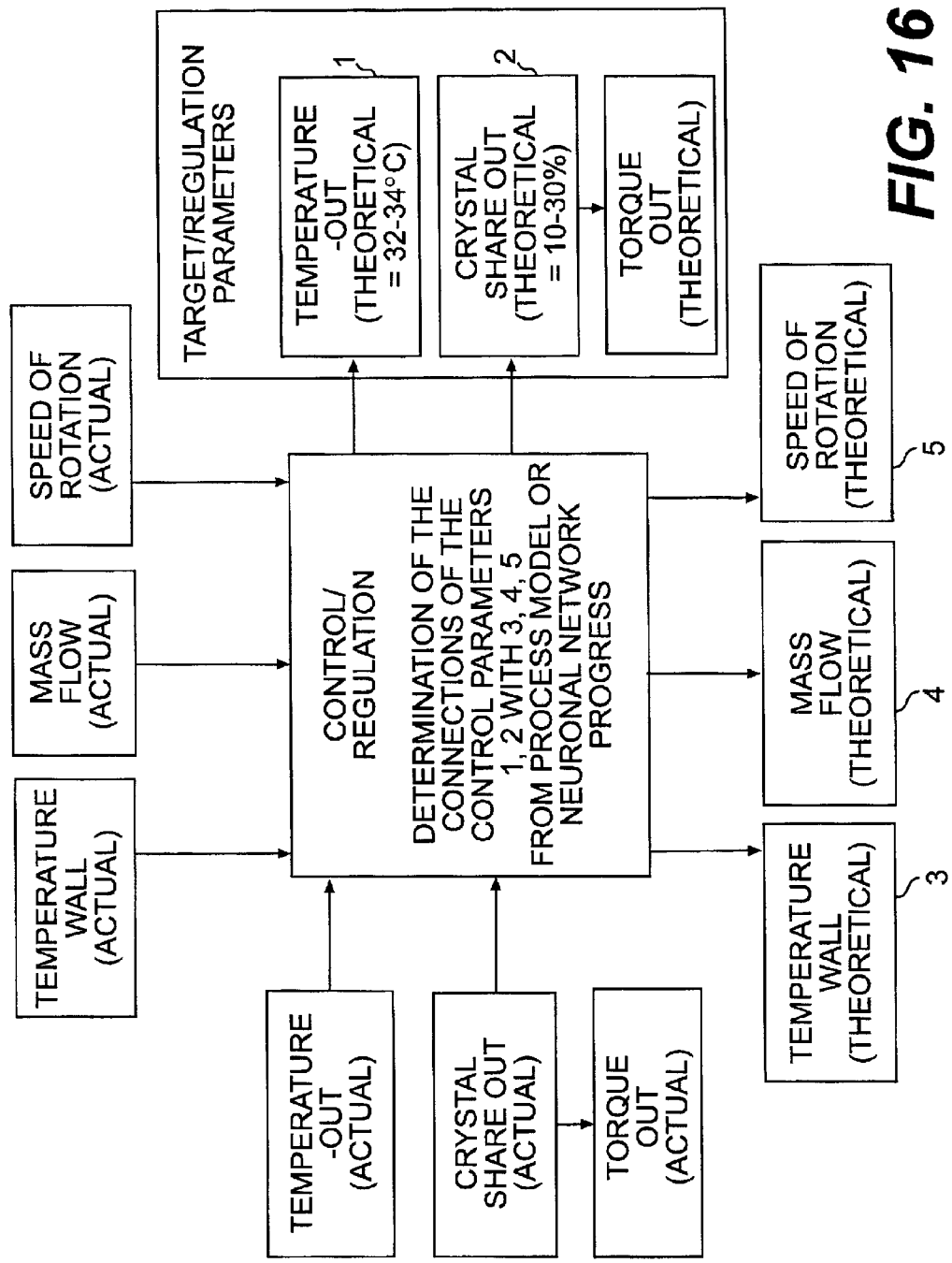

In FIG. 16 the schematic layout of the control/regulation for the generation of seed crystal suspensions with defined seed crystal content at a certain exit temperature is represented. A sensing of the seed crystal content is done indirectly via the torque measured on the shearing module shaft. This increases with the crystal content of the suspension and the accompanying increase in viscosity. An increase of the crystal content can be achieved via a reduction of the wall temperature and an extended dwelltime (=reduced mass flow). An increase in the speed of rotation accelerates the crystal formation kinetics up to an optimal speed of rotation. An additional increase in the speed of rotation causes an increase in temperature due increased energy dissipation and concomitantly a partial melting of crystals. The optimal speed of rotation thus depends on the wall temperature. Crystal germ sizes are set with the described optimal conditions (cf. FIGS. 13, 14) to ca. $\leq 10$ micrometers. The complex connection of the quantities: wall temperature, speed of rotation, and dwelltime (or mass flow) with the target/regulation indices exit temperature and crystal content can be described from the experimental data is collected in the form of approximate connections by means of approximation equations which are then implemented as control/regulation algorithms. The use of neuronal network programming represents a more elegant method which can also "learn" and allow non-linear relationships between said quantities to be described. The control/regulation is then realized according to the "learned" pattern.

Figure 17:
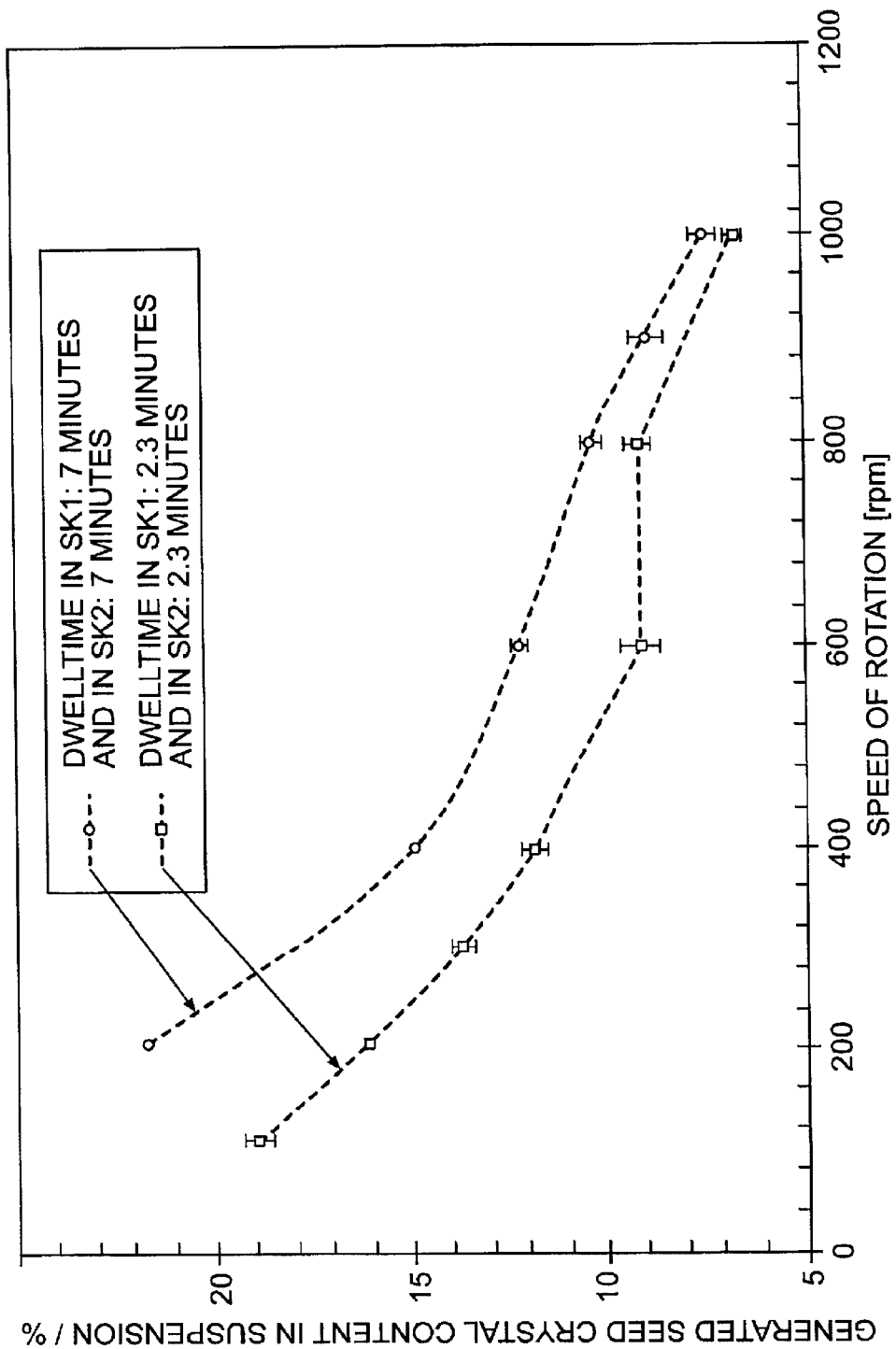

FIG. 17 plots generated crystal contents between ca. 5 and 22% in the seed crystal suspension, adjustable as a function of the speed of rotation, (here with the use of a two-step shearing module with wall-scraping installed elements with the following settings: Step I; n=900 rpm, coolant water temperature=10° C., Step II; speed of rotation was varied, coolant water temperature=30° C. (dwelltimes cr. FIG. 17).

The features to be seen in the abstract, in the claims, and in the description, as well as in the drawings can be significant individually as well as in arbitrary combinations for the realization of the invention.

List of Reference Numbers

1 Storage container with cocoa butter crystal suspension (32°–33° C.)
2 Storage container with chocolate mass (50° C.)
3 Mixer, static
4 Heat exchanger 5 Dosing pump
6 Process pump
7 Recirculation thermostats
8 Shearing/extending module, shear/extensional flow module
9 Suspension feedback
10 Thermal conditioning, multi-step
11 Cold-spray tower (−40° C.–0° C.)
12 Cocoa butter tank (50° C.–60° C.)
13 3-way cock
14 Torque measurement apparatus
15 Regulation unit for shearing module 8
16 Installed element as shearing element, in the form of a blade
17 " " " "
18 " " " "
19 " " " "
20 Edge area, tapered
21 " " "
22 Cylinder face, inner
23 Container, motor-driven, shaft body
24 Edge area, tapered
25 " " "
26 Periphery of the container 23
27 Support element
28 "
29 "
30 "
M Motors
SK1 Shear/extending module 1
SK2 Shear/extending module 2
t Time in minutes
rpm Speed of rotation per minute
° C. Degrees Celsius
Ra Radius of the cylinder face
$Ri_{II}$ Inner cylinder radius (shearing module Step II)
$Ri_I$ Inner cylinder radius (shearing module Step I)
$\beta_V$ Crystal modification form with melting range ca. 28° C.–32° C.
$\beta_{VI}$ Crystal modification form with melting range ca. 34° C.–39° C.
Pas Pascal-seconds=measure for dynamic viscosity
mJ/(s mg) Specific heat flow (millijoule per second and milligram)

References Cited

WO 98/30108

What is claimed is:

1. A process for producing seed fat crystal suspensions based on melted fats, comprising the steps of:
   cold-spraying a melted fat to form fat crystals of unstable crystal modifications;
   subjecting the fat crystals to a multi-step thermal treatment that results in formation of fat crystals of stable crystal modifications with a high melting point;
   suspending thermally treated fat crystals in a crystal-free melted fat to form a fat crystal suspension;
   applying a thermal/mechanical stress to the fat crystal suspension in a shearing module to produce a seed fat crystal suspension with a desired amount of stable crystal modifications; and
   adding the seed fat crystal suspension to a precooked product mass flow in an amount of between 0.01% and 0.2% of the product mass by weight.

2. The process of claim 1, wherein the melted fat is cocoa butter, the stable crystal modifications with a high melting point are $\beta_{VI}$-crystal modifications, and the product mass is chocolate or chocolate-like mass.

3. The process of claim 2, wherein the amount of fat crystals with $\beta_{VI}$-crystal modifications formed during the multi-step thermal treatment is equal to or greater than 10% of the total fat crystal by weight, and wherein the fat crystal suspension contains 1% or more thermally treated fat crystals by volume.

4. The process of claim 3, wherein the thermal conditioned fat crystals are suspended in the crystal-free melted fat at a temperature of about 1° C.–2° C. below a melting enthalpy peak minimal temperature of the $\beta_{VI}$-crystal modification to form the fat crystal suspension.

5. The process of claim 2, wherein the cold-spraying is performed in a refrigerated space by the following steps:
   generating melted cocoa butter drops with a drop size distribution from 1 to 200 micrometers by atomization of melted cocoa butter having a temperature of 40° C. to 60° C.; and
   spraying the melted cocoa butter drops into a cold gas flow with a gas speed of 0.1–1 meter per second and a gas temperature of −40° C. to 0° C.

6. The process of claim 1, wherein the multi-step thermal treatment comprises the steps of:
   storing the fat crystals at 12° C. for more than two days and;
   storing the fat crystals at 25° C. for more than 30 days,
   wherein the fat crystals are stored under conditions that prevent the formation of clumps of fat crystals.

7. The process of claim 2, wherein the thermally treated fat crystals are suspended in the crystal-free melted fat at a temperature of 26° C.–32.5° C.

8. The process of claim 1, wherein the thermal/mechanical stress is applied to the fat crystal suspension homogeneously in the shearing module to reduce the average crystal size to smaller than 10 µm, and wherein the seed fat crystal suspension has a fat crystal content of 5% to 35% by volume.

9. The process of claim 2, wherein the amount of fat crystals of stable $\beta_{VI}$-crystal modifications formed during the multi-step thermal treatment is equal to or greater than 10% of the total fat crystal by weight,
   wherein the thermal/mechanical stress is applied to the fat crystal suspension at about 32° C. to 34°, and
   wherein the amount of fat crystals of stable $\beta_{VI}$-crystal modifications in the seed fat crystal suspension is greater than 95% of the total fat crystal by weight.

10. A process for producing new seed fat crystal suspensions using a remnant of a seed fat crystal suspension, comprising the steps of:
   adding a melted fat to a remnant of a seed fat crystal suspension produced by the process of claim 1 to form a new fat crystal suspension;
   applying a thermal/mechanical stress with a constant temperature and stirring conditions to the new fat crystal suspension for less than 60 minutes to produce a new seed fat crystal suspension with a desired amount of stable crystal modifications; and adding the new seed fat crystal suspension to a precooled product mass flow in an amount of between 0.01% and 0.2% of the product mass by weight.

11. A process of producing a seed fat crystal suspension, comprising the steps of:
    applying a thermal/mechanical stress to a melted fat in a shearing module with a wall, a wall temperature between 10° C. and 25° C., and a dwelltime of greater than 150 seconds;
    continuously scraping off fat crystals formed on the wall;
    mixing the fat crystals with the melted fat until the formation of a seed fat crystal suspension with a desired amount of stable crystal modifications; and
    adding the seed fat crystal suspension to a precooled product mass flow in an amount of between 0.01% and 0.2% of the product mass by weight.

12. The process of claim 1, wherein the seed fat crystal suspension is added to the precooled product mass at a temperature between 32° C. and 35° C.

13. The process of claim 1, wherein the seed fat crystal suspension is added continuously to the product mass by dosing and protective, microhomogeneous mixing in such a manner that a partial melting of seed fat crystals is avoided.

14. A process of producing a seed fat crystal suspension, comprising the steps of:
    adding triglyceride mixtures to a melted fat to produce a fat crystal suspension; and
    applying a thermal/mechanical stress to the fat crystal suspension in a shearing module to produce a seed fat crystal suspension with a desired amount of stable crystal modifications.

* * * * *